United States Patent
Funai

(10) Patent No.: US 6,646,587 B2
(45) Date of Patent: Nov. 11, 2003

(54) DOPPLER RADAR APPARATUS

(75) Inventor: Mikio Funai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/170,373

(22) Filed: Jun. 14, 2002

(65) Prior Publication Data

US 2003/0117311 A1 Jun. 26, 2003

(30) Foreign Application Priority Data

Dec. 25, 2001 (JP) ........................ 2001-391832

(51) Int. Cl.[7] .......................... G01S 13/00; G01S 13/08
(52) U.S. Cl. ........................................ 342/26; 342/137
(58) Field of Search ........................ 342/26, 109, 115, 342/128, 133, 134, 135, 137, 195, 196, 460, 461; 331/2, 55

(56) References Cited

U.S. PATENT DOCUMENTS

| 4,754,277 A | * | 6/1988 | Voyce ........................ 342/83 |
| 4,851,852 A | * | 7/1989 | Bjorke et al. ............... 342/120 |
| 5,276,453 A | * | 1/1994 | Heymsfield et al. ........ 342/112 |
| 6,087,978 A | * | 7/2000 | Lalla et al. .................. 342/124 |
| 6,462,705 B1 | * | 10/2002 | McEwan ..................... 342/175 |
| 6,563,454 B2 | * | 5/2003 | Akasu .......................... 342/130 |

FOREIGN PATENT DOCUMENTS

JP 2000275329 A * 10/2000 ........... G01S/13/12

* cited by examiner

*Primary Examiner*—Thomas H. Tarcza
*Assistant Examiner*—Brian Andrea
(74) *Attorney, Agent, or Firm*—Oblon, Spivak, McClelland, Maier & Neustadt, P.C.

(57) ABSTRACT

A Doppler radar apparatus includes a first oscillator for generating a first sweep signal to repeatedly sweep a predetermined frequency range periodically; a second oscillator for generating a second sweep signal having sweep properties identical to those of the first sweep signal, the second oscillator 41b starting sweep before the first oscillator finishes frequency sweep; a power combiner for combining the first and second sweep signals to generate a transmission signal; a switch for receiving, as inputs, the first and second sweep signals, and switching an output between the first and second sweep signals synchronously with the timing when sweep with each of the first and second sweep signals is terminated; and a mixer for mixing a reception signal coming from a part of the transmission signal reflected in a target and received, and an output signal from the switch with each other to produce an output signal from the mixer.

6 Claims, 14 Drawing Sheets

τ: PULSE WIDTH
PRI: PULSE REPETITION INTERVAL
PRF: PULSE REPETITION FREQUENCY (PRF = 1/PRI)
Bs: FREQUENCY SWEEP WIDTH
Ts: SWEEP TIME (Ts = N x PRI)
SRF: SWEEP REPETITION FREQUENCY (SRF = 1/Ts)
To: OBSERVATION TIME (To = K x Ts = K x N x PRI)
K: NUMMBER OF ROUNDS OF OBSERVATION
N: NUMBER OF SWEEP PULSES

WHEN REAL VELOCITY (ORDINATE) DESIGNATED BY THE THICK SOLID LINE IS MEASURED, DOPPLER VELOCITY (ABSCISSA) BY THE BROKEN LINE IS OUTPUTTED.
($V_{nyq}$ IS FOLDED VELOCITY DEPENDING ON WAVELENGTH OF TRANSMITTED WAVE AND PULSE REPETITION FREQUENCY)

DOPPLER RADAR APPARATUS

BACKGROUND OF THE INVENTION

The present invention relates to a Doppler radar apparatus for observing the Doppler velocity and intensity of meteorological echoes by use of an FMICW modulated signal with a high pulse repetition frequency.

FIG. 13 is a diagram showing a system of related-art Doppler radar apparatus, for example, disclosed in the Unexamined Japanese Patent Application Publication No. 2000-275329. In FIG. 13, the system includes: a first highly stable local oscillator 1 for generating a signal at a frequency f1-fif; a second highly stable local oscillator 2 for generating a signal at a frequency f2-fif; a switching circuit 3 for switching the signals from the first and second highly stable local oscillators 1 and 2 alternately every pulse; a mixer 4 for mixing an output signal from the switching circuit with a signal at a frequency fif; an IF local oscillator 5 for generating a signal at the frequency fif; a high pass filter 6 for passing only signals at frequencies f1 and f2; a pin modulator 7 for pulse-modulating a signal; a transmitting tube 8; and a polarized-wave switching circuit 9 for switching a transmission path in accordance with a polarized wave.

The system further includes circulators 10 and 11; a mixer 12 for mixing the signals from the local oscillators 1 and 2; a low pass filter 13 for extracting a signal at a frequency fclk; a control circuit 14; TR limiters 15 and 27 for protecting a reception circuit from transmitted waves leaking into the reception circuit; high-frequency amplifiers 16 and 28; mixers 17 and 29; polarized component extracting filters 18 and 30 each for extracting a reception signal at the frequency fif; 90-degree shifters 19 and 31 each for providing a phase difference of 90 degrees; mixers 20, 21, 32 and 33; filters 23, 24, 34 and 35 each for extracting a Doppler signal; and A/D converters 25, 26, 36 and 37 each for converting an analog signal into a digital signal.

In meteorological radars for observing rainfall or snowfall, the velocity of the wind of an echo (raindrop or snowflake) can be gauged by use of the Doppler effect. When the wind is measured with a Doppler radar, however, the number of pulses shot per second (Pulse Repetition Frequency (PRF)) cannot be increased sufficiently in relation between the maximum observable range Rmax and the maximum observable velocity Vmax so that the measurement of the Doppler velocity is limited by phenomena as follows. One is a problem that folding of the Doppler velocity is generated, and the other is a limit in the observable range for suppressing the generation of secondary echoes.

C-band meteorological radars usually observe intensity in an observable range up to about 250 km. The PRF is limited by this maximum range Rmax of 250 km in the following relation.

$$PRF \leq C/(2 \times Rmax) \text{ (} C \text{ represents light velocity)} \quad (1)$$

Therefore, the PRF cannot be made higher than $3 \times 10^8$ m/s/(2×250 km)=600 Hz. On the other hand, in Doppler observation, the maximum velocity Vmax is limited in the following relational expression.

($\lambda$ designates wavelength, which is about 5.6 cm when the frequency is in the C-band ranging from 5,250 MHz to 5,350 MHz)

$$Vmax \leq |\lambda/2 \times PRF/2| \quad (2)$$

Normal meteorological radars need to be not lower than 40 m/s as their observable range of Doppler velocity. When the PRF is about 600 Hz, the observable range is, however, limited to 8.4 m/s in accordance with the expression (2). Accordingly, when Doppler observation is carried out, the PRF is increased to about 1,000 Hz to obtain the maximum velocity Vmax of 14 m/s, while observation is carried out a plurality of times with different PRFs. Thus, "processing of folding of Doppler velocity" is carried out to secure ±40 m/s or higher while the observable range is set to about 150 km.

(Detailed Description of Folding of Doppler Velocity)

In radars, a reception signal is obtained in every period corresponding to the PRF. The phase shift between the discrete signals received thus is used for the work of estimating an original continuous wave after measuring some points of the continuous wave. Therefore, as shown by a sampling theorem, the measuring limit of Doppler velocity $f_d$ is expressed by PRF/2 so that folding of Doppler velocity occurs in a frequency higher than PRF/2. Doppler velocity shown in the following expression (3) is called "folded velocity (Nyquist velocity) $V_{nyq}$. Actually, the wind velocity higher than $V_{nyq}$ really exists as described above. Thus, outputted (folded) Doppler velocity $V_r$ in the case of velocity $V_0$ higher than $V_{nyq}$ is expressed by:

$$V_r = V_0 \pm n \times V_{nyq} \text{ (} n=2, 4, 6 \ldots \text{)} \quad (3)$$

FIG. 14 shows a phenomenon of velocity folding. Since normal meteorological radars use approximately $\lambda=5.6$ cm, PRF=896 Hz, and $V_{nyq}=12.5$ m/s, for example, actual Doppler velocity obtained when the wind velocity is 20 m/s is 20−(2×12.5)=−5.0 (m/s). Accordingly, in actual Doppler radars, correction processing for canceling folding by use of two kinds of frequencies as PRF is carried out to expand the wind space measurable range into about three times as wide as $V_{nyq}$.

(Detailed Description of Secondary Echo)

For such a reason, in Doppler radars, the PRF is set to be relatively high to obtain $V_{nyq}$ as high as possible. As a result, the Doppler radars cannot help making the Doppler observable range $R_{max}$ narrower than the intensity observable range in accordance with the expression (1). The Doppler observable range $R_{max}$ becomes 167 km at the PRF of 896 Hz. In this case, there appears a false target (called a secondary echo) if an intensive echo exists in a range exceeding the radius of 167 km which is the observable range. It has been therefore necessary to take separate measures to remove the secondary echo.

Next, description will be made on the operation of the related-art apparatus. In the related-art apparatus, two kinds of frequencies are used to double the observable range of Doppler velocity. The operation at that time will be described below.

Signals at frequencies f1-fif and f2-fif are outputted from the first and second local oscillators 1 and 2 respectively. These signals are switched alternately in a transmission repetition period (the reciprocal of the repetition frequency PRF) by the switching circuit 3, and transmitted with their polarized waves changed, respectively. The repetition period with which two reception systems corresponding to those polarized waves receive the signals is twice as long as the transmission repetition period (that is, the repetition frequency is half as high as the transmission repetition frequency). Accordingly, the maximum velocity Vmax of each received signal becomes halved in each of the two reception systems in accordance with the expression (2). However, since the signals are transmitted and received alternately, Doppler velocity can be measured at the initial repetition frequency by use of both the received signals.

For example, assume that the repetition frequency is 1,000 Hz. In this apparatus, signals are transmitted at the frequencies f1 and f2 with their polarized waves changed. Thus, the signals are independent of each other, and the repetition frequencies of their own become half, that is, 500 Hz, respectively. Accordingly, the maximum range Rmax observable in each of the respective reception systems is 300 km. On the other hand, Doppler velocity can be also observed up to velocity equivalent to 500 Hz×2=1,000 Hz by continuous processing of signals received alternately. Thus, the observable range of Doppler velocity is doubled to have the relation Rmax=C/PRF. Incidentally, since the periods of alternate transmission and reception are overlapped, the polarized waves of signals for transmission and reception are changed to prevent the signals from interfering with each other in this apparatus.

In the related-art Doppler radar apparatus, there has been a problem that the scale of the apparatus is so large that the cost increases because two kinds of polarized waves (horizontal one: H and vertical one: V) are switched and transmitted alternately in such a manner as described above. In addition, as for the frequency band, the frequencies f1 and f2 have to be prepared. Thus, there has been a problem that the apparatus is apt to interfere with other radar apparatus in terms of radio license. On the other hand, even with such a configuration, the pulse repetition frequency cannot be increased over about 1,000 pps on a large scale. Therefore, "correction processing of velocity folding" using two kinds of pulse repetition frequencies has been required as described in the related art.

SUMMARY OF THE INVENTION

The invention is achieved to solve the foregoing problems. It is an object of the invention to provide a Doppler radar apparatus which can measure velocity up to the maximum velocity of ±40 m/s or higher by use of a single pulse repetition frequency without performing "correction processing of velocity folding". It is another object of the invention to provide apparatus in which, in addition to the previous object, the observable range of Doppler velocity can be expanded to be as wide as the intensity observable distance range. Further, it is another object of the invention to provide a method for realizing such radar apparatus.

A Doppler radar apparatus according to the invention include: a first oscillator for generating a first sweep signal to repeatedly sweep a predetermined frequency range periodically; a second oscillator for generating a second sweep signal having sweep properties identical to those of the first sweep signal, the second oscillator starting sweep before the first oscillator finishes frequency sweep; a synthesizer for synthesizing the first and second sweep signals to generate a transmission signal; a switch for receiving the first and second sweep signals as inputs, and switching an output between the first and second sweep signals synchronously with timing when sweep with each of the first and second sweep signals is terminated; and a mixer for mixing a reception signal reflected in a target, and an output signal from the switch with each other to produce an output signal from the mixer.

Further, the Doppler radar apparatus according to the invention may include an A/D converting unit for converting the output signal from the mixer into a digital signal, and a first range FFT processing unit for applying FFT processing to the digital signal to compute distance information.

Further, the Doppler radar apparatus according to the invention may include a filtering unit for weighting an amplitude component of the signal subjected to the distance FFT processing so that frequency characteristic is in inverse proportion to an amplitude value corresponding to clutter to thereby remove the clutter component from the digital signal.

Further, the Doppler radar apparatus according to the invention may include a weighting unit for weighting frequency characteristic before the A/D conversion so that loss is large in a lower frequency and minimal in a higher frequency.

Further, the Doppler radar apparatus according to the invention may include first and second amplifiers for amplifying the first and second sweep signals respectively, so that the synthesizer synthesizes signals amplified by the first and second amplifiers.

Further, the Doppler radar apparatus according to the invention may include a second FFT processing unit having a number of process points different from that in the first range FFT processing unit, and provided at an output of the A/D converting unit in parallel with the first FFT processing unit.

DETAILED DESCRIPTION OF THE PREFERRED EMBODIMENTS

In the Doppler radar apparatus according to the invention, a Hi-PRF signal which is high in pulse repetition frequency is used as a transmission signal while frequencies are swept (chirped) with time, and a received signal is subjected to fast Fourier transform (FFT) processing to compute a distance. By shortening the sweep interval in such a manner, it is possible to shorten the time interval for sampling Doppler velocity. Accordingly, the measurable range of Doppler velocity can be expanded on a large scale.

(Embodiment 1)

Figure 1:
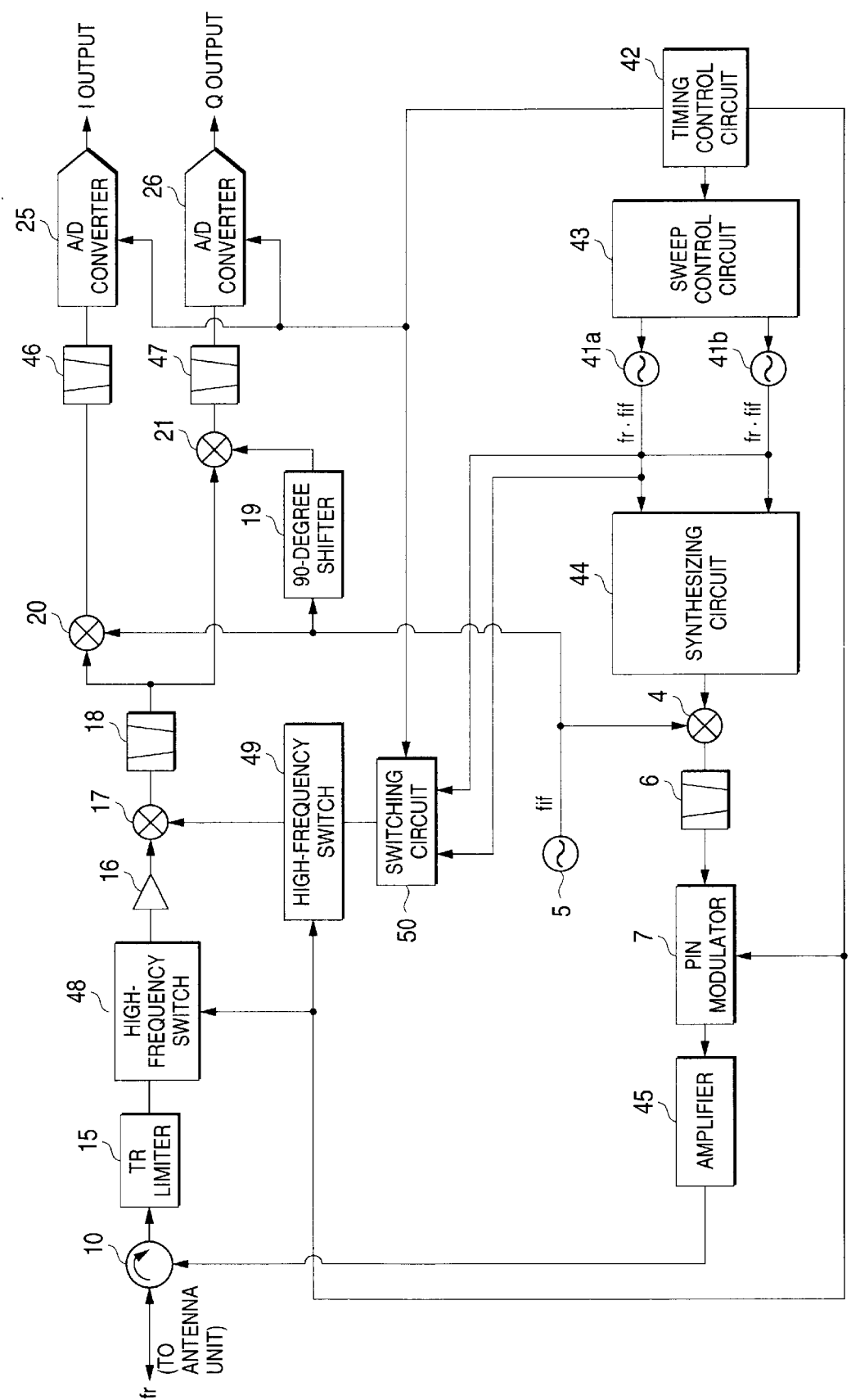
FIG. 1 is a block diagram showing the hardware configuration of a Doppler radar apparatus according to Embodiment 1 of the invention.

Embodiment 1 of the invention will be described below with reference to the drawings. In FIG. 1, the system of the Doppler radar apparatus includes: oscillators 41a and 41b for generating signals while sweeping frequencies like saw teeth in the same frequency range; a timing control circuit 42 for determining temporal timing of various operations based on a reference signal; a sweep control circuit 43 for carrying out temporal control for synchronization of sweep by the oscillators 41a and 41b; a combining circuit 44 for synthesizing high-frequency signals from two channels; and a high-frequency amplifier 45 for amplifying the high-frequency signal to a signal level adequate to be transmitted through an antenna.

The system further includes clear region filters 46 and 47 for determining a video band of the reception system; high-frequency switches 48 and 49 for preventing the transmission signal from leaking into the reception system; and a switching circuit 50 for switching the high-frequency signal from the oscillator 41a or 41b alternately. Here, the reference numerals or symbols with alphabetical suffixes such as 41a and 41b designate circuits having properties of the same frequency and the same phase.

Figure 2:
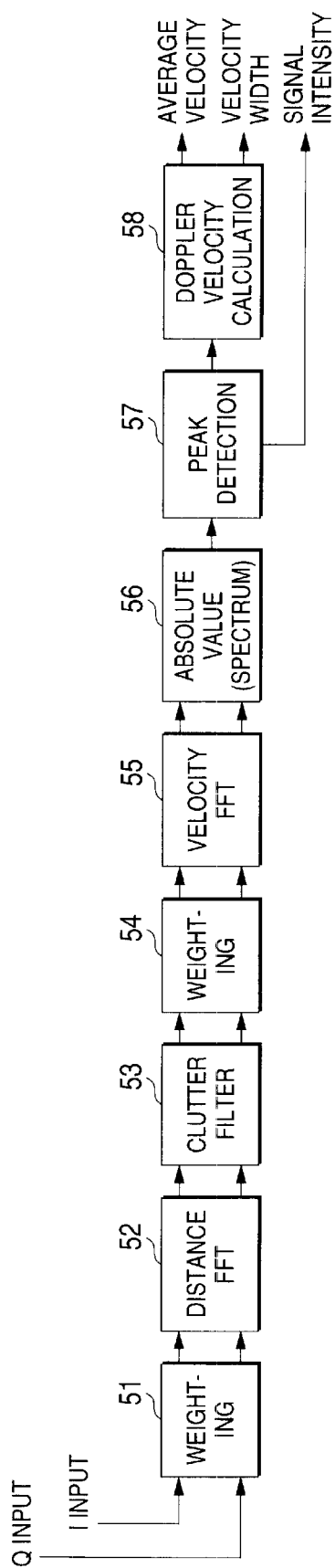
FIG. 2 is a block diagram showing the flow of signal processing in the Doppler radar apparatus according to Embodiment 1 of the invention.

In addition, FIG. 2 shows the flow of the signal processing. In FIG. 2, there are provided weightings 51 and 54; FFT processing 52 in the range direction; a clutter filter 53; FFT processing 55 in the velocity direction; absolute value processing 56 for transform into a power spectrum; peak detection processing 57 for detecting a signal peak position from the spectrum; and Doppler velocity calculation processing 58 for calculating average velocity and velocity width from the peak position.

Figure 3:
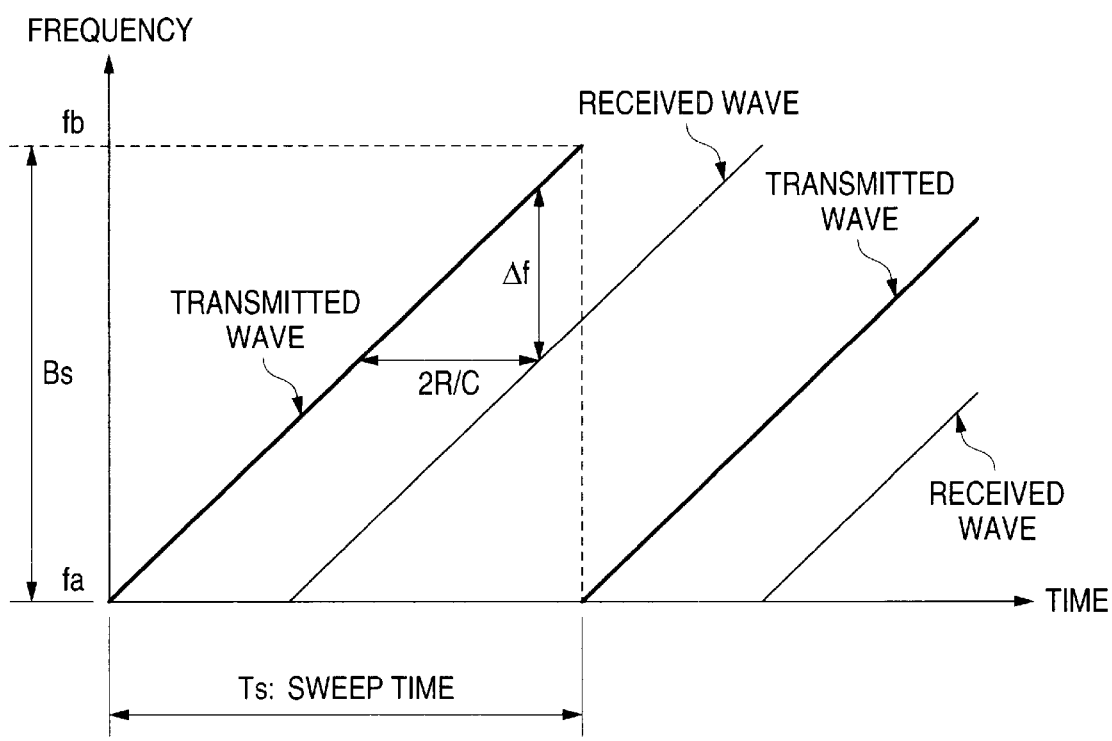
FIG. 3 is a graph showing the relationship between short-time frequency sweep and time based on FMCW.

First, the fundamental operation of an FMICW (Frequency Modulated and Interrupted Continuous Wave) system which is a feature of this apparatus will be described. FIG. 3 shows the distance measuring principle of the FMICW system, which is the same as that of the FMCW system. The FMICW system is a system for switching timing between transmission and reception alternately with a switch to thereby operate transmission and reception by time division when isolation (signal isolation) between transmission and reception cannot be secured sufficiently. In the meteorological Doppler radar shown as the related-art example, a distance was calculated from a temporal difference between the time instant when a pulse signal was transmitted from an antenna (not shown) and the time instant when a reflected signal from an echo was received.

On the other hand, in the FMICW system, a distance is calculated from a frequency difference caused by a time delay required for reception. As shown in FIG. 3, when frequencies from fa to fb are swept linearly for a time Ts, a signal reflected and received from an echo at a distance R is received after a delay of the time 2R/C (temporal difference corresponding to the out and return distance 2R between the radar and the target) where C designates light velocity. A frequency difference Δf between transmission and reception is provided at this time by the following expression.

$$\Delta f = 2 \cdot R \cdot (fb - fa)/(C \cdot Ts) \quad (4)$$

$$= 2 \cdot (Ro - Vt) \cdot (fb - fa)/(C \cdot Ts)$$

wherein R=Ro−Vt (V: echo velocity, t: time).

Figure 4:
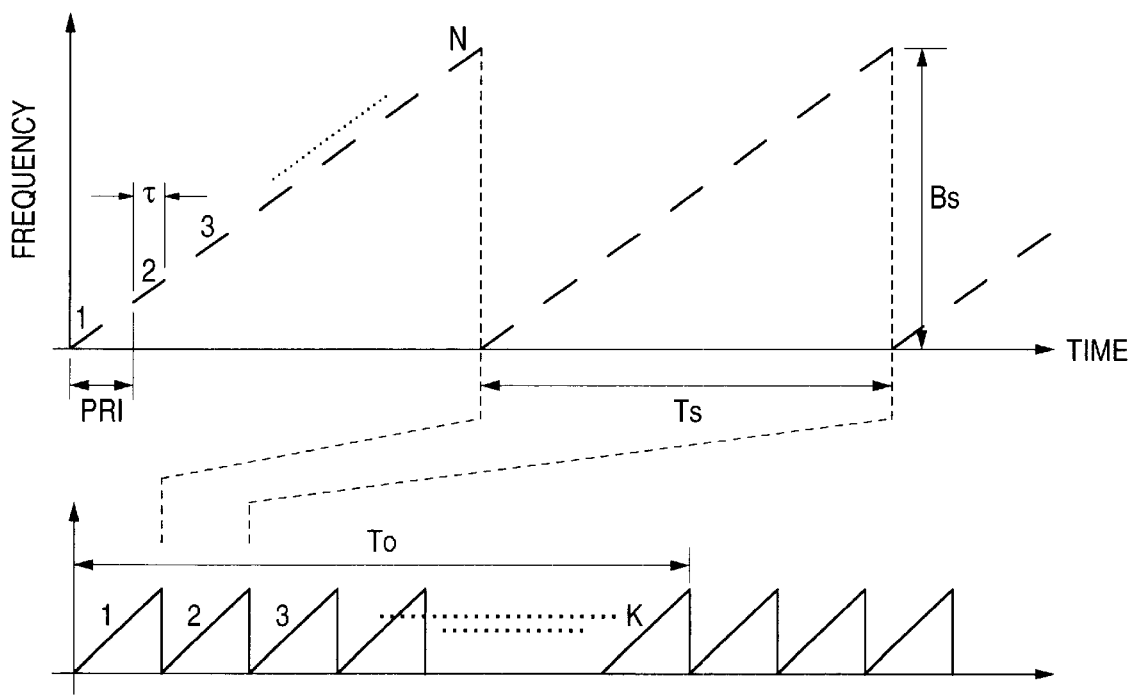
FIG. 4 is a graph showing the relationship between whole observation time and frequency sweep based on FMICW.

On the other hand, FIG. 4 shows the case of intermittent transmission and reception by the FMICW system. In the FMICW system, reception is performed during the period when transmission is suspended, and the temporal rate of the transmission and that of the reception are made substantially equal to each other, that is, 50%. Accordingly, differently from the FMCW system, average power corresponding to approximately 50% of peak power becomes equivalent to transmission power in the FMICW system. FIG. 4 shows the case where transmission and reception are repeated N times in each sweep, and such sweep is repeated K times. The reason why transmission and reception are repeated N times in each sweep is to carry out FFT processing on N points in the range direction to calculate a distance. In addition, the reason why the sweep is repeated K times is to sample reflected signals from an echo discretely to calculate Doppler velocity via FFT processing. This operation of sampling K times in each sweep is equivalent to the operation of reception in a repetition period of PRI (the reciprocal of the repetition frequency PRF) in the related-art apparatus.

Description will be made below on the operation in FIGS. 1 and 2. The oscillators 41a and 41b generate signals with the frequency sweep properties shown in FIG. 3, but the oscillators differ in time instant of sweeping. The sweep control circuit 43 controls the synchronization relation of such frequency sweep properties or such sweep start time instants. The sweep control circuit controls the oscillators to generate signals alternately while partially overlapping with each other temporally. This temporal relation will be described later. This sweep control circuit is a digital circuit, and the oscillators themselves have highly stable frequency characteristics due to digital control. For example, the oscillators may be direct digital synthesizers (DDS) which generate high-frequency signals directly from a high precision time base. These frequency stability and sweep properties are produced from this time base so that frequency characteristics with very high accuracy are obtained.

The high-frequency signals (frequency fr-fif) outputted from the oscillators are synthesized into one channel by the synthesizing circuit 44 and then supplied to a mixer 4 to generate a transmission signal (frequency fr). (This transmission signal is also a signal for frequency sweep similarly.) The transmission signal is passed through a filter 6 and pulse-modulated by a pin modulator 7. Here, the transmission signal is modulated not at a repetition frequency of about 1,000 Hz as in the related art but at a very high repetition frequency of approximately several tens of kHz to several MHz. After that, the transmission signal is amplified to a final output level by the amplifier 45. Here, the final output level is not an output level generated by a related-art high power transmitting tube but an output level low enough to be generated by a semiconductor amplifier of approximately 1 W to 100 W. After that, the transmission signal is radiated from an antenna unit to the space through a circulator 10 in the same manner as in the related art. In this case, the plane of polarization in the antenna may be either a horizontal polarization one or a vertical polarization one.

A reception signal reaches a TR limiter 15 via the antenna. This TR limiter is provided to limit the level to be lower than a predetermined value to prevent the reception system from being broken due to the transmission signal leaking into the reception system. However, since the transmission level is low in comparison with that in the related art, a high voltage-proof limiter is not necessary. After that, the reception signal reaches a mixer 17 through the high-frequency switch 48. The high-frequency switch 49 similar to the switch 48 is provided on the local signal input side of the mixer. Thus, the transmission signal is cut at the two places to be perfectly prevented from leaking into the reception system. In addition, as the local signal to the mixer 17, the output of the oscillator 41a or 41b is switched alternately by the switching circuit 50. The switching is carried out at every time instant when the respective oscillators terminate sweeping. Control signals for the switching circuit 50, the high-frequency switches 48 and 49, the pin modulator 7, the sweep control circuit 43, and so on, are generated by the timing control circuit 42 using the same time base as a reference signal.

The intermediate frequency (IF) output of the mixer 17 is converted into a digital signal in A/D converters 25 and 26 in the same manner as in the related art. There are provided clear region filters 46 and 47 in the preceding stage of the A/D converters 25 and 26. These filters are band pass filters for removing DC components, which are directly leaking in from the transmission wave, and for removing pulse-modulated harmonic components of the pulse repetition frequency. The filters have an important role in converting the reception signal into a non-modulated continuous wave (CW) signal.

Since the reception signal is processed as a digital signal after that, the flow of the signal processing will be described functionally with reference to FIG. 2. First, in order to calculate distance information, an A/D converted I/Q signal is multiplied by a window function in the weighting 51, and then subjected to fast Fourier transform (FFT) processing in the range FFT 52. The weighting is a process for suppressing a side lobe generating in the FFT processing. A Hamming window is usually used for the weighting. When a Hamming window is adopted, the side lobe can be suppressed by about 43 dB relatively to the main signal (main lobe). The range FFT processing is a process for separating signals (N temporally discrete sampled signals) received during frequency sweep for every range (by frequency in this process).

After the range FFT processing, signals reflected from the Earth's surface (unnecessary waves) are removed by a clutter filter. Signals due to reflection from the Earth's surface are unnecessary signals for meteorological observation of rainfall or snowfall. Since the frequency of such a signal has no Doppler effect, the signal is fundamentally a DC signal whose frequency is zero. On the other hand, meteorological echoes of rainfall or snowfall are driven on the wind. Therefore, such an echo usually has a positive or negative velocity. The clutter filter has a function as a high pass filter for removing DC components and passing only AC components by use of such characteristics. Incidentally, such a clutter filter carried out blanket processing on all the ranges in the related-art meteorological radars. However, since processing is carried out for every range in this apparatus, the filter properties can be altered for every range.

After the clutter processing, in order to calculate velocity information in the same manner as in the distance calculation, the signal subjected to the clutter processing is multiplied by a window function in the weighting 54, and then subjected to fast Fourier transform (FFT) processing in the velocity FFT 55. By this processing, the signal is converted into a velocity spectrum (complex number data), and then subjected to the absolute value processing 56 so that phase components are removed therefrom. Then, only amplitude spectral information (scalar) is extracted. Such spectral information is obtained for every range cell, and there is a signal peak with a Gaussian distribution in a frequency band corresponding to the velocity of a meteorological echo.

A peak is searched for the spectrum in every range in the peak detection 57, and the signal intensity is calculated from the amplitude value of a signal existing in the peak, and outputted. In addition, the frequency of the peak position corresponds to the velocity of the meteorological echo. Thus, the average velocity is calculated from the frequency of the peak position in the Doppler velocity calculation processing 58, while the standard deviation is calculated from the distribution of peak spectra and outputted as velocity width.

Figure 5:
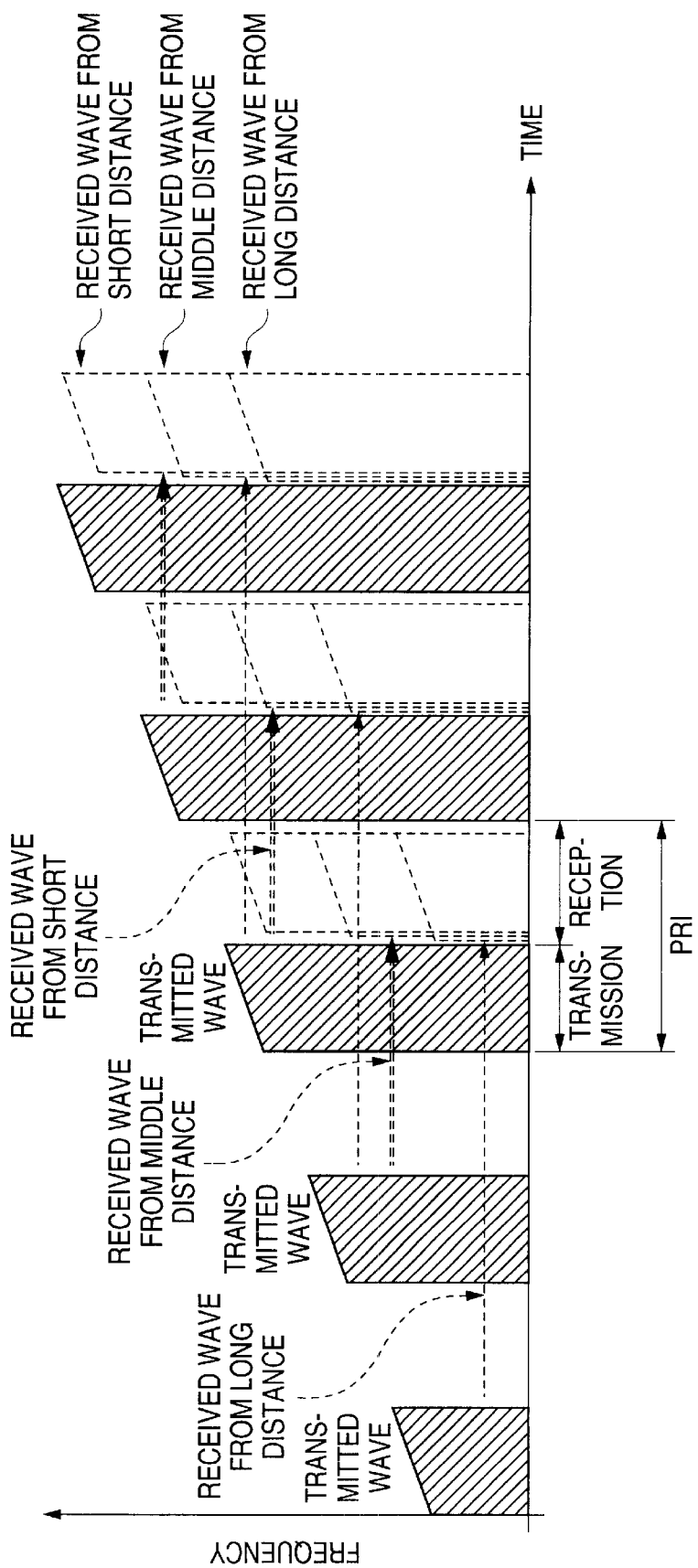
FIG. 5 is a graph showing the temporal relationship between transmission and reception depending on the difference in observation distance based on FMICW.

The operation of this apparatus was described above. The method thereof will be described below. In the FMICW system, signals are sampled only once during the reception period of FIG. 4, and FFT processing is carried out on all the sampled signals (=N siganls) to calculate a distance. As for this calculation, the relation between the frequency and the distance has been shown in the expression (4). Since a high repetition frequency (high PRF) is generally used in the FMICW system, reception signals reflected from a long distance need a long time. Thus, such a signal is received in the middle of frequency sweep so that there occurs a lag between the whole frequency sweep period and the reception period. Accordingly, normal reception processing cannot be carried out. Such a state is shown in FIG. 5. In order to observe a long distance, it is therefore necessary to place a standby period for the reception processing until a signal returns from the maximum observable range Rmax. When Rmax is 300 km, about 2 msec is required as standby time Tsa.

$$(Tsa = 2\ Rmax/C = 2 \times 300\ km/3 \times 10^5\ km/sec)$$

On the other hand, for the Doppler observation, it is necessary to shorten the sweep repetition period. Measurable echo velocity V is obtained in the following expression from the wave length $\lambda$ of the transmission signal and the time interval for extracting velocity of a reflected signal (in this case, every sweep repetition period=Tsb).

$$Vmax = \lambda/2 \times (1/2\ Tsb) \geq V \tag{5}$$

As an observable wind velocity range, ±40 m/s or more is generally required. In the C-band ranging from 5,250 MHz to 5,350 MHz, the wavelength $\lambda$ is about 5.6 cm, and hence the sweep interval Tsb is limited as follows.

$$|Vmax| = \lambda/2 \times (1/2\ Tsb) \geq 40\ m/s \tag{6}$$

∴ Tsb ≦ 350 us

In the example of this apparatus, the sweep interval Tsb is set to 256 us on the basis of the relationship. Accordingly, Vmax becomes ±54.7 m/s.

Figure 6:
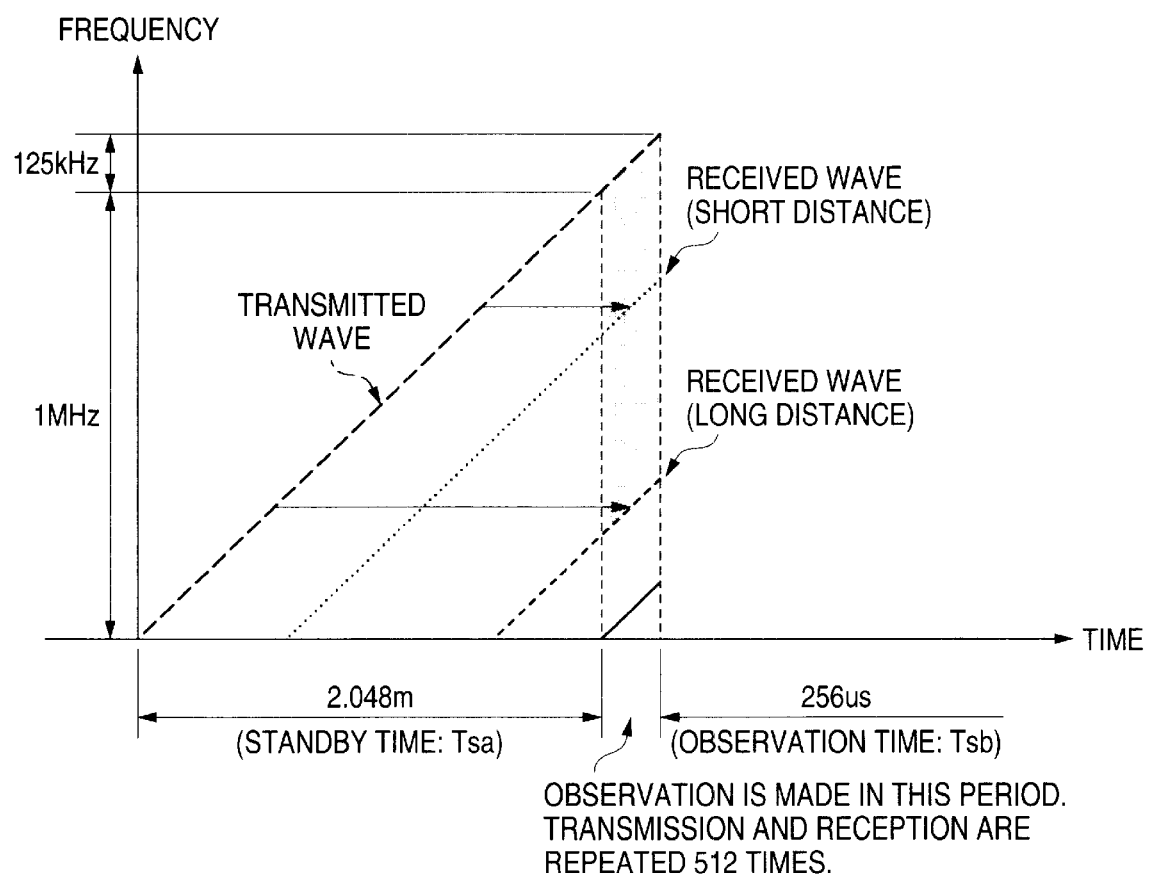
FIG. 6 is a graph showing the relationship between standby time and observation time for explaining the features of FMICW according to the invention.

As a result, in this apparatus, the temporal relationship shown in FIG. 3 is displaced so that the sweep time Ts is set in the relation Ts=Tsa+Tsb as shown in FIG. 6. Thus, observation is carried out in a short time after standby time has passed.

On the other hand, distance resolution dR is determined as follows.

$$dR = C/(2Bs) \tag{7}$$

The distance resolution dR is set to 1,200 m in the example of this apparatus. Therefore, conversely, the sweep frequency width Bs becomes 125 kHz. In addition, since the standby time (Tsa) is set to 2.048 msec, the frequency swept during the standby time becomes 1 MHz. Such a temporal relation is shown in FIG. 6. Since the distance resolution (dR) is 1,200 m, about 256 range bins (the number of data in the distance direction) are required to observe a distance up to about 300 km. Between the number of range bins and the number N of sweep pulses, there is a relation of the number of range bins=N/2, and the maximum distance Rmax becomes dR×N/2. Accordingly, since N is set to 512 in this apparatus, the pulse repetition frequency PRF is 2 MHz (=N/Tsb=512÷256 us), and the real Rmax becomes 307.2 km. In addition, since the ratio of transmission to reception is approximately 50% as described above, the pulse width τ becomes 50% of the pulse repetition interval PRI, that is, τ=~0.25 us.

Figure 7:
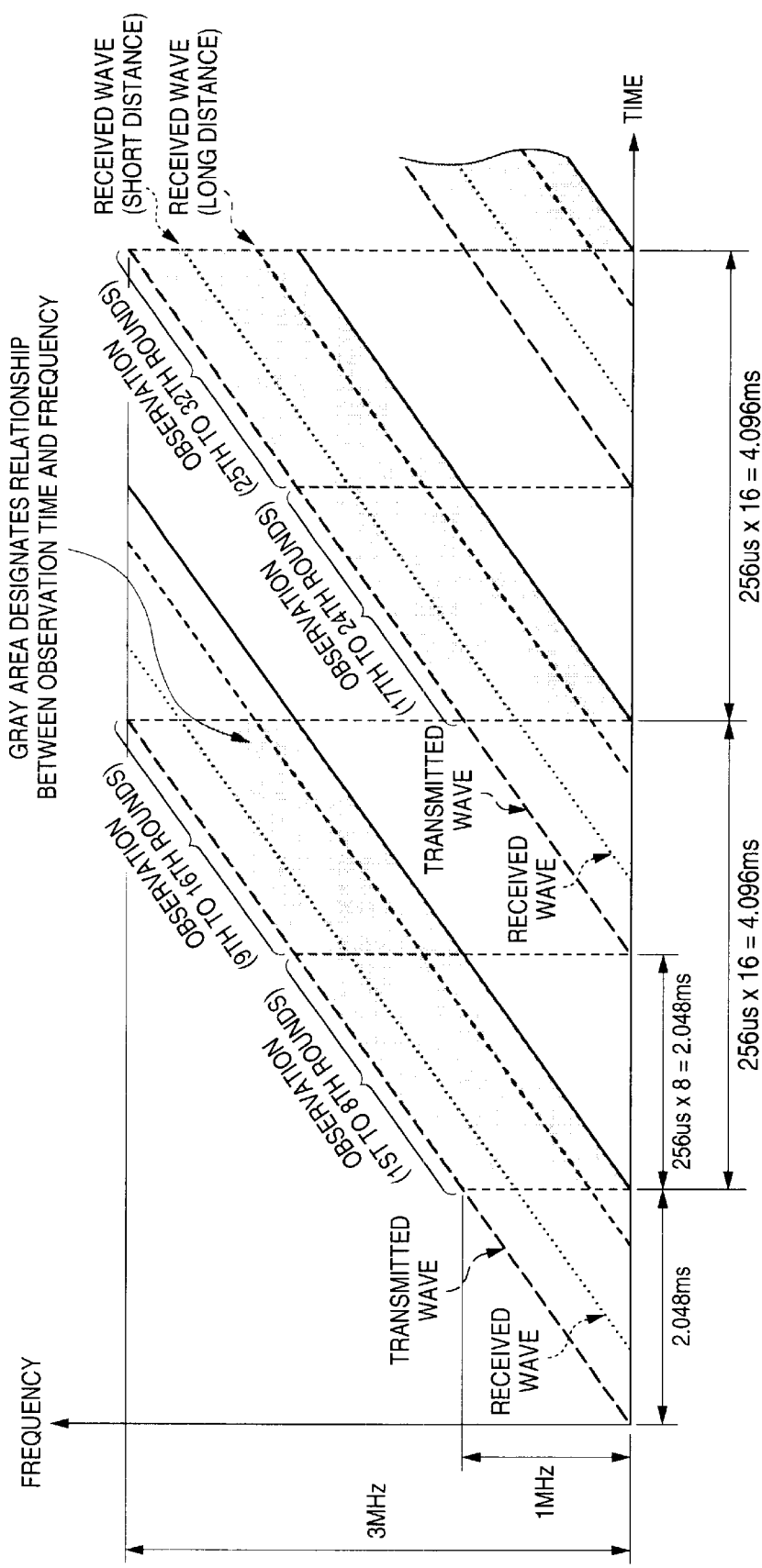
FIG. 7 is a graph for explaining the relationship between frequency sweep and observation time in FMICW according to the invention.

Since the standby time Tsa is longer than the sweep interval Tsb in this method, continuous observation cannot be achieved directly. As a countermeasure against this problem, the first round of observation is followed by 16 rounds of observation during one sweep in this apparatus as shown in FIG. 7. Further, to start the next sweep in advance after 8 rounds of observation are carried out, the next sweep corresponding to the standby time of the second sweep is started at the point of time when the 9th round of observation starts. The reason why the next sweep is started in the middle of the first sweep is to carry out transmission beforehand toward a long distance in order to make cycles of observation continuous.

On the other hand, as for the timing of reception, it is necessary to carry out the reception processing continuously. Therefore, as soon as the first sweep is terminated, processing is switched to the next sweep to continue the reception. At the moment when the first sweep is terminated, the standby time of the next sweep has been terminated. Thus, continuous observation can be achieved by switching the oscillators 41a and 41b synchronously with every time instant when sweep is terminated.

Since sweep is continued during this observation period, when the 8th round of observation is completed, the transmission frequency shifts by 2 MHz (=125 kHz×8+sweep width 1 MHz during standby time) from the frequency with which observation is started first. On the other hand, the frequency difference from a signal reflected from the maximum distance Rmax is 1 MHz according to the expression (4). Therefore, the bandwidth required in the reception system also becomes 1 MHz, and signals with a frequency difference wider than this frequency width are removed by the clear region filters 46 and 47 in FIG. 1. By such low pass properties of the clear region filters, sweep signals in the second sweep which are 2 MHz distant from those in the first sweep are removed. Thus, there is no fear that the sweep signals in the second sweep are mixed into reception signals for observation in the first sweep and affect the reception signals.

The reason why the temporal relation is set so that periods of frequency sweep overlap each other thus is that signals (discrete temporally) for Doppler observation have to be sampled continuously. In the example of this apparatus, 16 rounds of observation are performed in every sweep, and further 32 sweeps are performed. (Since 16 rounds of observation are performed in every sweep, the total number K of rounds of observation performed is K=16×32=512 so that continuous 512 points of sampled data are obtained.) In this case, velocity resolution ΔV can be obtained as follows because the maximum velocity Vmax is divided by K.

$$\Delta V = 2 \cdot V\text{max}/K = 2 \times 54.7/512 = 0.21 \, [m/sec] \quad (8)$$

Accordingly, the maximum distance with which signal processing can be carried out is 307.2 km (which is not defined as a distance in which radio waves actually reach with intensity, but defined as a computational reachable distance). In this range, meteorological echoes with maximum velocity up to ±54.7 m/s can be measured with the velocity resolution of 0.2 m/s.

On the other hand, when continuous 16 rounds of observation are performed in every sweep, phases at the moments when the respective rounds of observation are started have to be set to be the same. (The variation among the phases would appear as an error in Doppler velocity.) If there were a variation among the phases, phase correction could be carried out in subsequent stage signal processing (before velocity FFT processing). In such a case, however, the load of processing would increase. In this apparatus, since the sweep width Bs is 125 kHz and the sweep period Tsb is 256 us, the phase difference is set to be repeated in 2π·Bs·Tsb= 2π32. Thus, the phase is fixed whenever sweep is started.

In addition, observation time To (=time required for observing all the distances and Doppler velocities) are expressed as follows.

$$To = 2.048 \, ms + (4.096 \, ms \times 32 \, \text{sweeps}) \cong 2.048 \, ms \times 65 = 133.12 \, ms \quad (9)$$

On the other hand, the time required for observing one direction is about 133 ms as described above. In normal meteorological radar apparatus, observation is carried out on 256 (=M) divisions of the circumference of 360° while a directional antenna is rotated azimuthally (horizontally). Accordingly, the time required for observing the circumference is 133.12 ms×256≅34 sec. This corresponds to rotation of the antenna in about 2 rpm. This rotational speed is a slightly slow speed for normal Doppler observation, but is within a practically allowable range.

Next, transmission power will be considered as an index of the range where radio waves reach actually. In normal C-band meteorological radars, high-power transmitting tubes such as magnetrons or klystrons are used to output about 250 KW as peak power. By way of example, assume that the antenna rotational speed S is 2 rpm, the pulse width τ is 1 us, and the pulse repetition frequency PRF is 500 Hz. In this case, the number H of hits per azimuth bin can be calculated in accordance with H=60 sec/(S×M)×PRF. Accordingly, the number H of hits per azimuth bin is about 58. In addition, the distance resolution is 150 m because the pulse width τ is 1 us. Since 1,200 m is integrated by 150 m unit, the number of integrals is 8 per range bin. The number of possible integrals by azimuth bins and range bins is 58×8=464, but these integrals are non-coherent so that the integral effect thereof is limited to a square root thereof. On the other hand, FFT processing is performed twice in this apparatus. Accordingly, coherent integration is performed twice so that a high integral effect (proportional to the first power) can be obtained. Therefore, the multiplication effect of the distance FFT (N=512 integrals) and the Doppler velocity FFT (K=512 integrals) can be obtained. From above, transmitting power Pm (average) required in this apparatus can be calculated as follows.

Average Transmitting Power:

$$Pm = 250 \, KW \times \sqrt{464}/(512 \times 512) = 20.5 W \quad (10)$$

This result means average power, corresponding to about 40W as peak power of a transmission amplifier because the ratio of transmission to reception is 50%. This calculation result is tentative, and not to say, it changes in accordance with the fluctuation of meteorological echoes. Nevertheless, the transmitting power is very low in comparison with 250 KW.

On the other hand, according to the expression (4), the distance changes in accordance with the velocity when the observation time To increases. In the example of this apparatus, since To is 133 ms and Vmax is 54.7 m/s, the distance changes up to 7 m. However, such a change is negligible because the distance resolution dR is 1,200 m.

Further, according to the expression (5), the Doppler velocity changes due to the change of the wavelength $\lambda$ caused by frequency sweep. Since the central frequency is about 5,300 MHz, the sweep width is 3 MHz, and the maximum velocity Vmax is 54.7 m/s, there occurs an error up to about 0.03 m/s. This error can be canceled by compensating the phase in advance in accordance with an individual frequency difference before the Doppler velocity FFT processing. However, since the velocity resolution is 0.21 m/s, the velocity error has a small value in comparison with the velocity resolution. It is therefore possible to omit such a compensating circuit in order to simplify the circuitry. Incidentally, since the velocity fluctuation (referred to as "velocity width") of meteorological echoes shows a value sufficiently larger than this error, the error is negligible practically.

(Embodiment 2)

In Embodiment 1 of the invention, the processing for removing clutter was carried out before the velocity FFT processing in FIG. 2. Therefore, this clutter filter was a time-series digital filter. Normally, such digital filters are often arranged in a multi-feedback type, such as IIR (Infinite Impulse Response) filters, in which data obtained by sampling is processed in time series. Such clutter filters have been optimized for properties in related-art meteorological radars for many years, and hence the clutter filters have been time-proved. However, in the arrangement mainly made for FFT processing as in this apparatus, a filter for weighting on a frequency axis is preferred because it is easily put into practice.

In addition, in the related-art apparatus, a distance was measured only by the delay time of a reflected signal without frequency sweep. This brought about a circumstance that uniform filter properties could not help being applied to any distance direction. However, the Earth's surface conditions where radar apparatus was particularly installed were different from place to place. Even if there was a high mountain in a specific distance, the same filter would be applied to any distance in front of the mountain or at the rear of the mountain. Thus, the related-art apparatus had a disadvantage in that reflected signals in a low velocity region of meteorological echoes were weakened.

Figure 8:
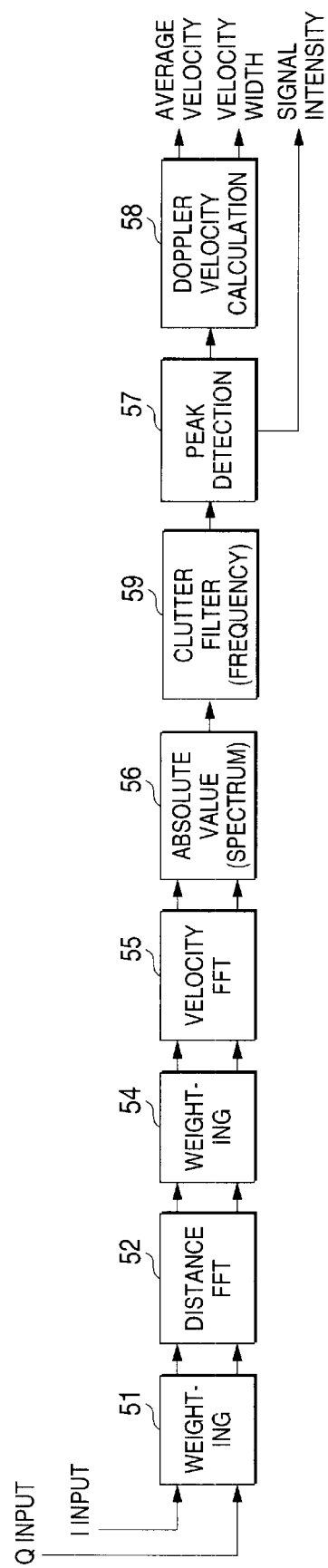
FIG. 8 is a block diagram showing the flow of a signal in a Doppler radar apparatus according to Embodiment 2 of the invention.

In this apparatus according to the invention, the filter properties can be changed for every range bin. FIG. 8 shows the flow of signal processing according to Embodiment 2. In FIG. 8, a new clutter filter 59 for performing weighting by frequency is provided after the absolute value processing in place of the related-art clutter filter 53.

Figure 9:
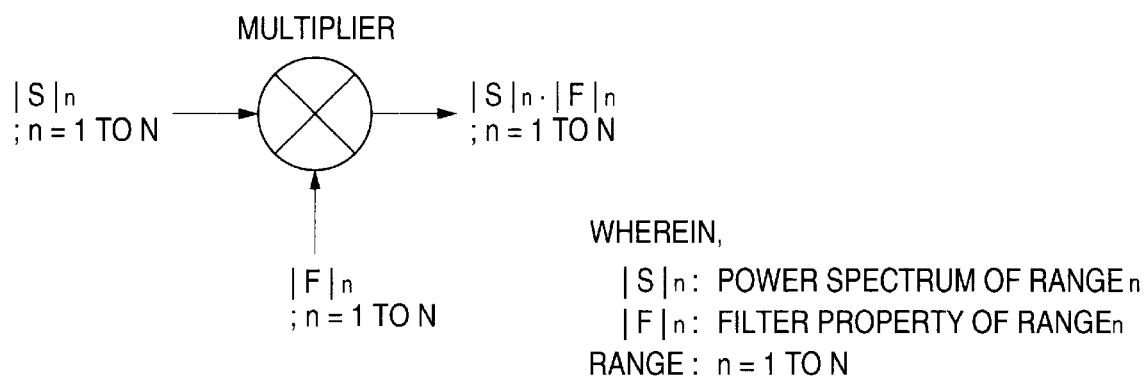
FIG. 9 is a diagram for explaining the function of a clutter filter according to Embodiment 2 of the invention.

This clutter filter 59 has a function of performing multiplication on input spectral data with weighting of a coefficient determined in advance. This coefficient value (scalar) is the filter property, and is multiplied by an input spectral value. FIG. 9 shows the internal structure of the clutter filter 59. Since the frequency of clutter has usually a spectral shape protruding like a peak near the frequency zero, the filter property contrary to the spectral shape (the property which is null near the frequency zero) is provided. The filter property is optimal when the multiplication result becomes flat on the frequency characteristic. In this apparatus, such a null property can be switched in accordance with the distance. In this case, a plurality of coefficient value files may be prepared for every range in advance to be selectively used for every range.

(Embodiment 3)

Figure 10:
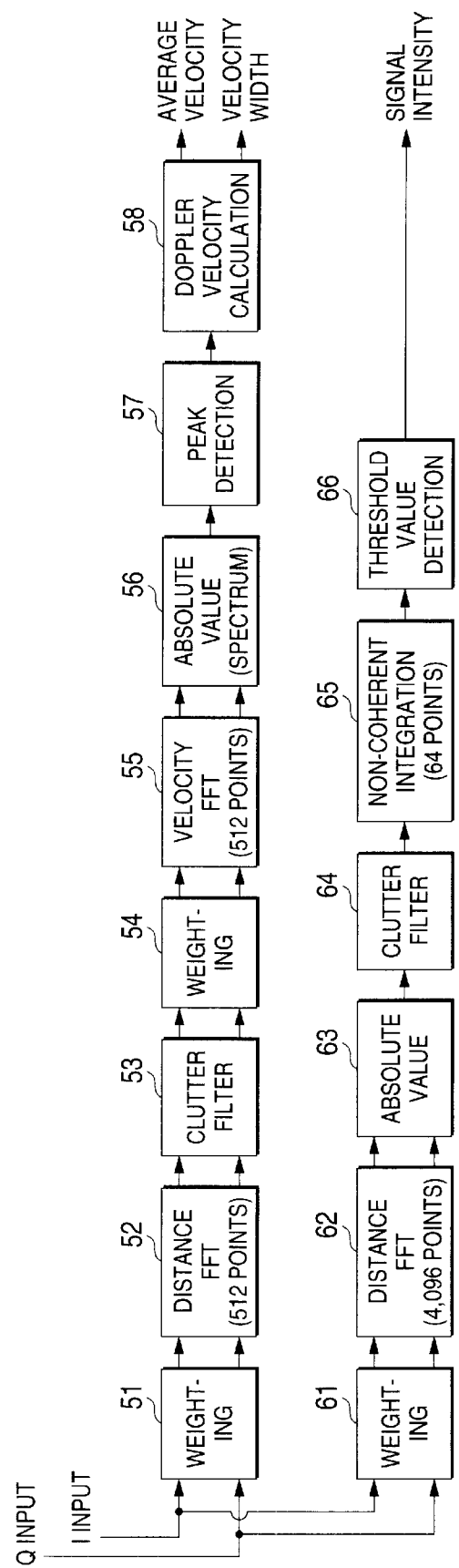
FIG. 10 is a block diagram showing the flow of signal processing in a Doppler radar apparatus according to Embodiment 3 of the invention.

FIG. 10 shows the flow of the signal processing changed into two series in Embodiment 1 of the invention. In FIG. 10, the upper series have the same configuration as that shown in FIG. 2, but the lower series are added newly. The upper series have the same configuration as that in FIG. 2, except that outputting of signal intensity from the peak detection 57 is stopped and only Doppler velocity information (average velocity and velocity width) is outputted. This flow has a feature in that the signal intensity is outputted from the lower series.

For the Doppler velocity information, the range resolution is 1,200 m because the sweep width Bs is 125 kHz as described above. In the lower series, the range resolution is increased to 150 m (1/8-fold). It is therefore necessary to set the sweep width to 1 MHz (=125 kHz×8). As shown in FIG. 7, during every sweep, frequency sweep of 2 MHz is carried out for the time of 4.096 ms (=256 us×16) and 16 rounds of distance observation are carried out. Accordingly, in the lower series, the 8 rounds in the upper series are united into one round, and range FFT is carried out on the united round. Thus, in the range FFT processing in the lower series, the number of points 512 of the FFT processing in the upper series are multiplied by 8 so that 4,096 points are obtained. Since the distance observation time in the upper series is made thus 8 times as long as that in the upper series, the distance observation interval is lengthened to 2.048 ms (=256 us×8). Accordingly, the maximum velocity Vmax of Doppler velocity is narrowed into 1/8-fold so that there arises a velocity folding phenomenon unsuitable for measuring Doppler velocity. In the lower series, however, only the amplitude is measured so that the signal intensity is outputted.

The operation about the configuration of the lower series of FIG. 10 will be described specifically. An input signal is shared between the upper and lower series. In the lower series, weighting at 4,096 points is carried out in weighting 61. After that, FFT processing is carried out on the 4,096 points, and phase components are removed in absolute value processing 63 so that the removed input signal is converted into only an amplitude value. After that, Earth's surface reflection is removed in a clutter filter 64 in the same manner as in related-art meteorological radars. Velocity FFT is carried out in the upper series while integral processing is then carried out 64 times in non-coherent integration 65. The non-coherent integral processing is a process of averaging with only amplitude values including no phase. This processing is a time-series process playing a role in smoothing non-correlated thermal noise. After that, a reception signal beyond the noise level is detected with an appropriate signal to noise ratio (S/N ratio) in threshold value detection 66.

When a plurality of series for signal processing are provided thus to change the time division for distance measurement and the number of points in FFT processing, measuring can be achieved while changing the range resolution of the signal intensity and the range resolution of the Doppler velocity. In this example, the distance resolution of the signal intensity is 150 m while the distance resolution of the Doppler velocity (average velocity and velocity width) is 1,200 m.

(Embodiment 4)

Figure 11:
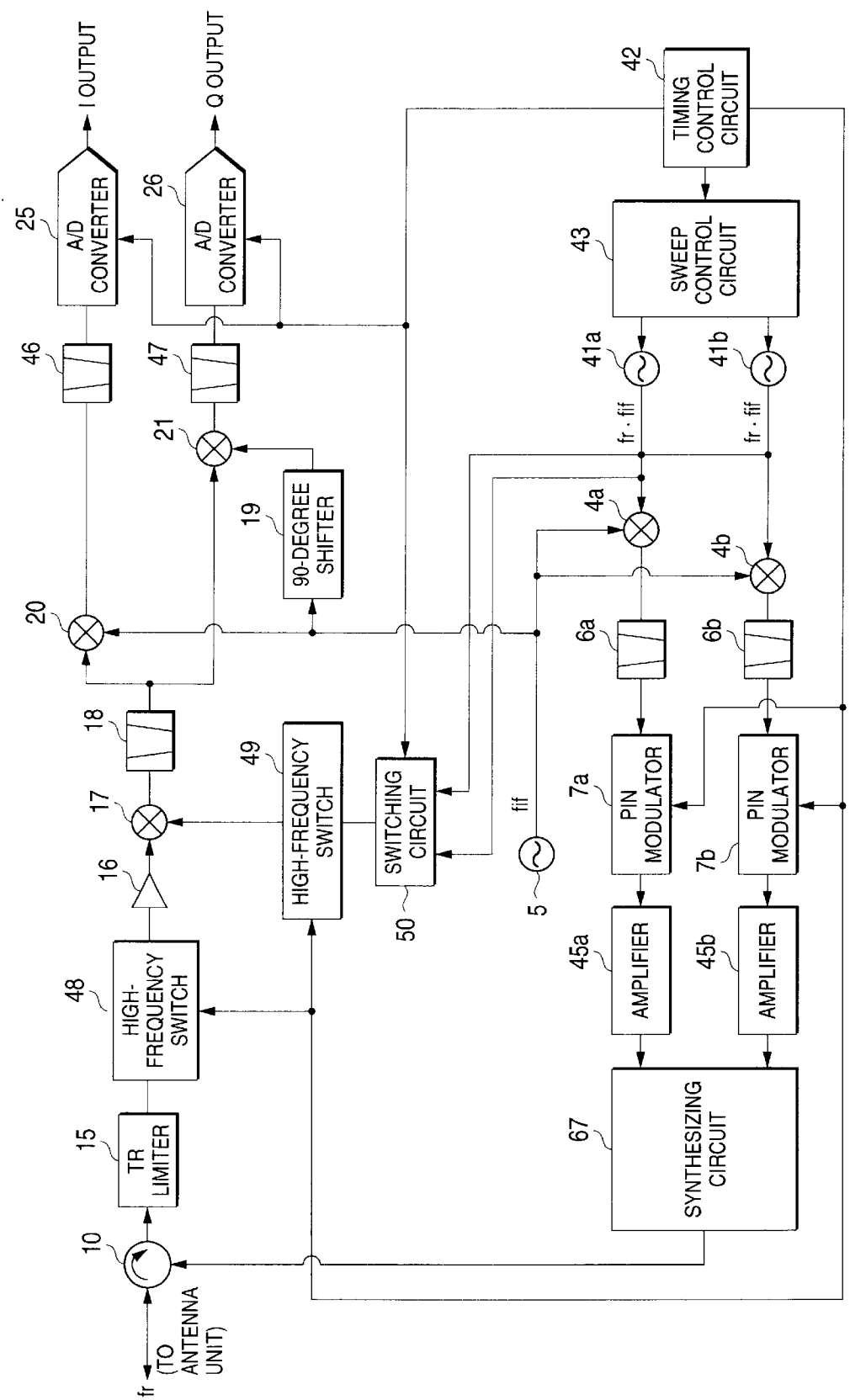
FIG. 11 is a block diagram showing the hardware configuration of a Doppler radar apparatus according to Embodiment 4 of the invention.

FIG. 11 shows the configuration in which the transmission system in Embodiment 1 of the invention is divided into two series. Although sweep signals of the oscillators 41a and 41b were combined directly into one channel by the combining circuit 44 in FIG. 1, the outputs of amplifiers 45a and 45b are combined by a combining circuit 67 in FIG. 11. With such a configuration, it is possible to reduce spurious signals caused by inter-modulation appearing in the mixer 4. In the configuration of FIG. 1, there is a frequency difference of 2 MHz between the output frequencies of the oscillators 41a and 41b due to the difference in sweep timing. Since the signals of two frequencies are fed to the mixer 4, spurious signals are produced due to inter-modulation when the signals of two frequencies are mixed with a local signal. Particularly when digital circuits such as direct synthesizers are used as the oscillators 41a and 41b, spurious signals are easily produced. It is therefore possible to prevent intermodulation effect if signal circuits are separated as shown in FIG. 11.

In addition, the powers of the amplifiers 45a and 45b have to be made as high as possible because they perform final amplification. Although the power of about 40 W was shown in this apparatus by way of example, two kinds of signals may be inputted simultaneously in the configuration of FIG. 1. Therefore, each signal level is limited to half the amplifier capacity. However, when the amplifiers are operated in C class (full power), the signal levels are limited to the capacities with which the amplifiers can output. Thus, the signal levels fluctuate in accordance with the incident wave number of those signals. To avoid such fluctuation, there can be considered a method in which the sweep time in FIG. 7 is further elongated to 2.048 ms×4=8.192 ms to make a state that there are always two waves. In this method, however, each output level remains half.

To output each signal level at 40 W, the power of 80 W is required as the capacity of the amplifier 45. When the amplifier 45 is constituted by two amplifiers as shown in FIG. 11, each of the amplifiers may have a capacity with which the power of 40 W can be outputted. Thus, the power of 80 W can be achieved easily. Particularly, when semiconductor amplifiers are used, two-amplifier arrangement is preferred to achieve higher power because these output level in the band of 5,300 MHz is close to the limit of the semiconductor amplifiers.

(Embodiment 5)

Figure 12A:
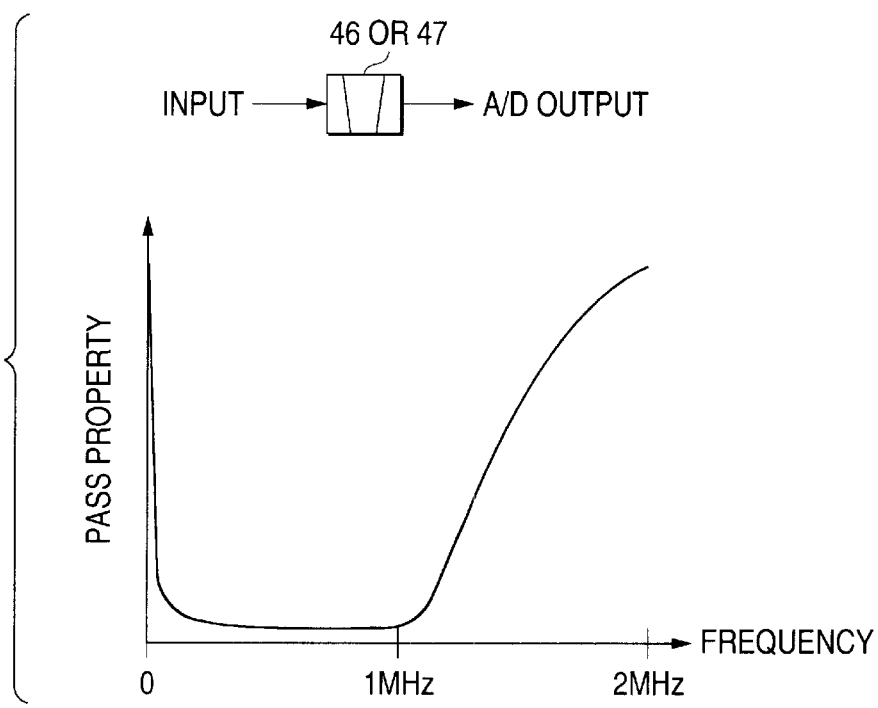
FIGS. 12A and 12B are graphs for explaining the properties of a clear region filter and an equalizer according to Embodiment 5 of the invention.
Figure 12B:
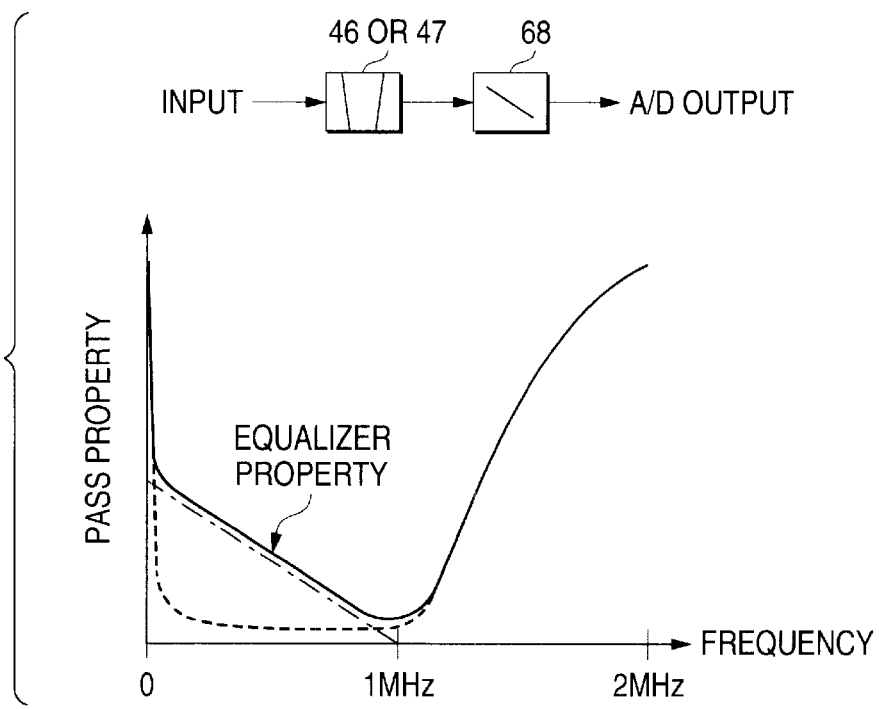
Figure 13:
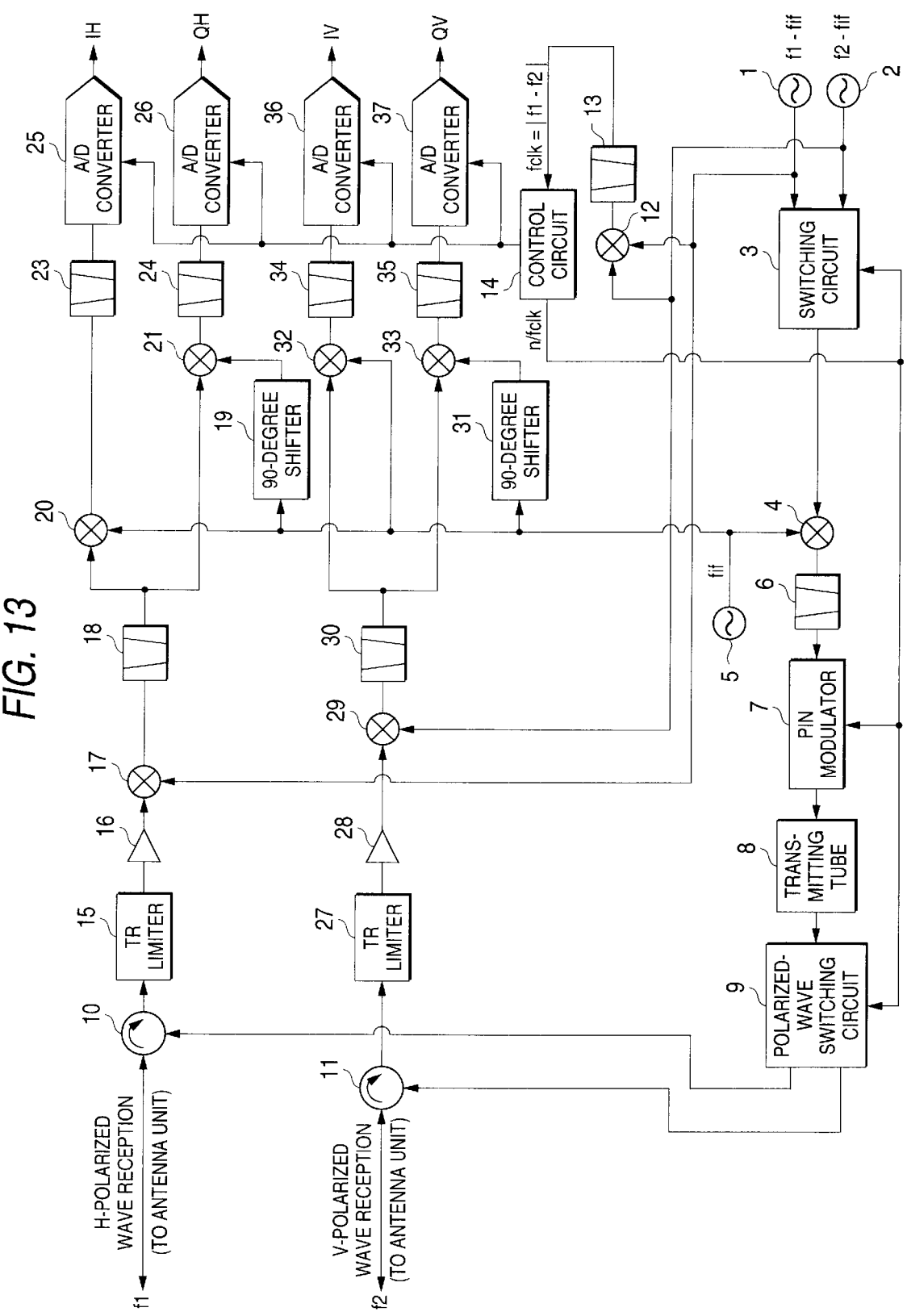
FIG. 13 is a block diagram showing the hardware configuration of a related-art Doppler radar apparatus.
Figure 14:
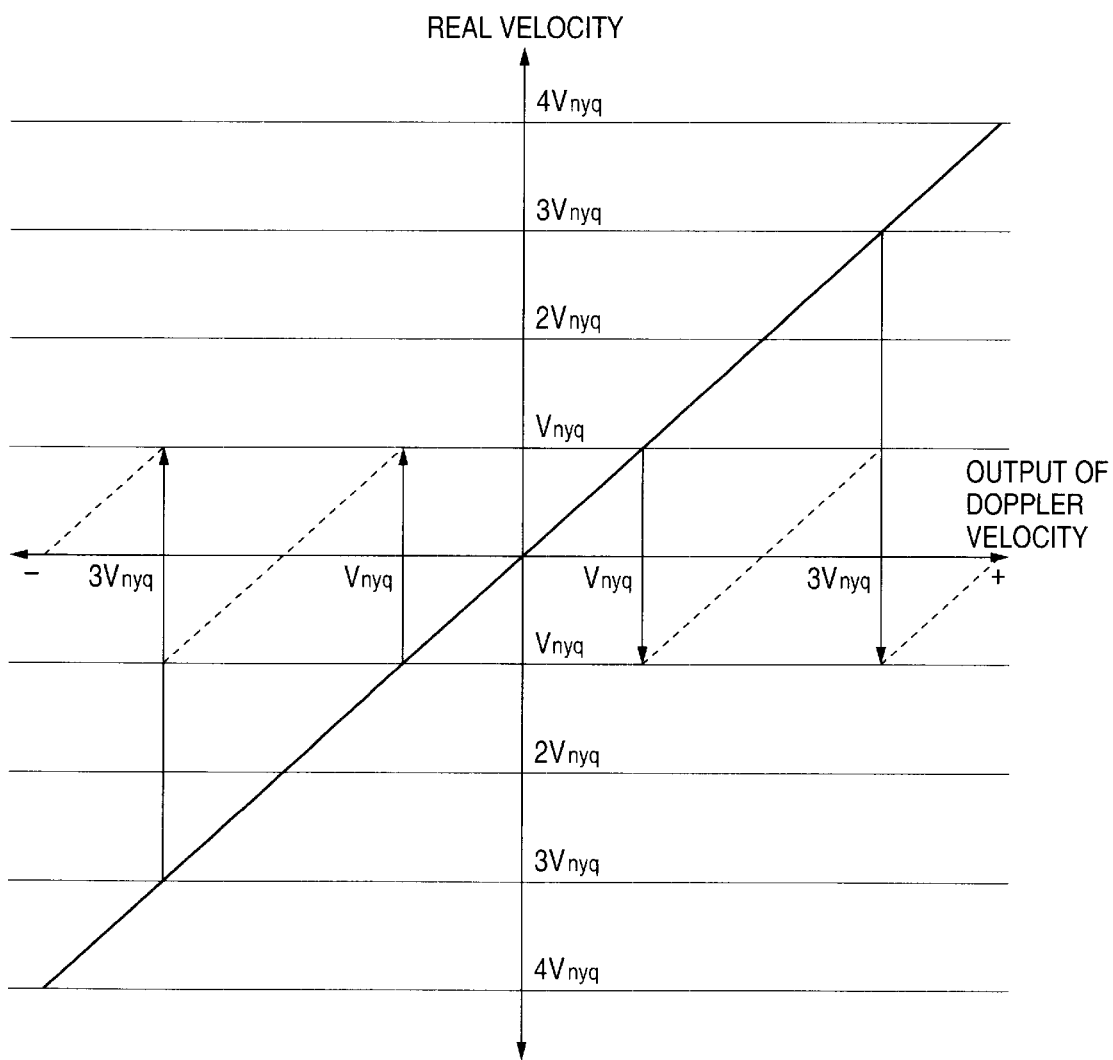
FIG. 14 is a graph showing the features of the related-art Doppler radar apparatus about Doppler velocity measurement.

FIGS. 12A and 12B are diagrams showing an embodiment in which an equalizer 68 is added to one of the clear region filters in Embodiment 1 of the invention to change the band pass properties of reception signals. The clear region filters are important in determining the band width of reception signals. The clear region filters have a high pass property for preventing transmitting waves (frequency zero) from leaking into the reception system, and plays a role in passing the band (1 MHz) of reception signals and removing unnecessary waves caused by pulse modulation (2 MHz). This property is shown on FIG. 12A.

In meteorological radars, the reception signal level at a short distance is high, and the signal level becomes lower at a longer distance. This change is substantially proportional to the square of the distance. Related-art apparatus adopted a method in which a circuit called STC (Short Time Constant) was provided to change the gain of a reception system synchronously with the shot of a transmitted pulse. On the other hand, in this apparatus, the difference in distance is received as a difference in frequency due to the frequency modulation based on FMICW. A reception signal from a short distance appears at a low frequency while a reception signal from a long distance appears at a high frequency. Accordingly, the reception levels based on meteorological echoes have a tendency that the level of a low frequency is high and the level of a high frequency is low.

FIGS. 12A and 12B show an example in which the equalizer 68 is added so that the difference in level caused by the distance is compensated by use of the attenuation property. This equalizer is designed so that loss is large in a low frequency and becomes minimum at the cut-off frequency (near 1 MHz in FIG. 12) of the clear region filter. Such a property can be achieved by an LC circuit having inductance and capacitance. The attenuation property obtained by the combination of this equalizer 68 and the clear region filter 46 or 47 is shown in FIG. 12. The change of the signal level with the distance difference can be reduced by the level correction using the equalizer.

When the difference in signal level caused by the distance difference is compensated thus, the dynamic range of the signal amplitude fed to the A/D converters 25 and 26 in the next stage can be narrowed so that the resolution of the A/D converters can be reduced. As a result, the number of bits of signals handled by the digital circuits following the A/D converters can be reduced so that FFT processing and so on can be carried out at a high speed and easily while the cost can be reduced.

What is claimed is:

1. A Doppler radar apparatus comprising:

a first oscillator for generating a first sweep signal to repeatedly sweep a predetermined frequency range periodically;

a second oscillator for generating a second sweep signal having sweep properties identical to sweep properties of said first sweep signal, said second oscillator starting sweep before said first oscillator finishes frequency sweep;

a synthesizer for synthesizing the first and second sweep signals to generate a transmission signal;

a switch for receiving the first and second sweep signals as inputs, and switching an output between the first and second sweep signals synchronously with timing when sweep with each of the first and second sweep signals is terminated; and a mixer for mixing a reception signal coming from a part of the transmission signal reflected in a target and received, and an output signal from said switch with each other to produce an output signal from said mixer.

2. The Doppler radar apparatus according to claim 1, further comprising:

an A/D converting unit for converting the output signal from said mixer into a digital signal; and a first range FFT processing unit for applying FFT processing to the digital signal to compute distance information.

3. The Doppler radar apparatus according to claim 2, further comprising:

a filtering unit for weighting an amplitude component of the signal subjected to the range FFT processing so that frequency characteristic is in inverse proportion to an amplitude value corresponding to clutter to remove the clutter from the digital signal.

4. The Doppler radar apparatus according to claim 2, further comprising:

a weighting unit for weighting frequency characteristic before the A/D conversion so that loss is large in a lower frequency and minimal in a higher frequency.

5. The Doppler radar apparatus according to claim 1, further comprising:

a first amplifier for amplifying the first sweep signal;

a second amplifier for amplifying the second sweep signal, wherein
said power combiner combines signals amplified by said first and second amplifiers respectively.

6. The Doppler radar apparatus according to claim 2, further comprising:

a second FFT processing unit having a number of process points different from a number of process points in said first range FFT processing unit, and provided at an output of said A/D converting unit in parallel with said first FFT processing unit.

* * * * *